United States Patent
Pawliszyn

(10) Patent No.: US 11,656,160 B2
(45) Date of Patent: May 23, 2023

(54) APPARATUS FOR SOLID PHASE MICROEXTRACTION

(71) Applicant: JP SCIENTIFIC LIMITED, Waterloo (CA)

(72) Inventor: Janusz Pawliszyn, Waterloo (CA)

(73) Assignee: JP SCIENTIFIC LIMITED, Waterloo (CA)

( * ) Notice: Subject to any disclaimer, the term of this patent is extended or adjusted under 35 U.S.C. 154(b) by 457 days.

(21) Appl. No.: 16/869,872

(22) Filed: May 8, 2020

(65) Prior Publication Data

US 2020/0355587 A1    Nov. 12, 2020

Related U.S. Application Data

(60) Provisional application No. 62/846,033, filed on May 10, 2019.

(51) Int. Cl.

| G01N 30/06 | (2006.01) |
|---|---|
| G01N 1/40 | (2006.01) |
| B01J 20/32 | (2006.01) |
| G01N 30/00 | (2006.01) |

(52) U.S. Cl.
CPC .......... *G01N 1/405* (2013.01); *B01J 20/3208* (2013.01); *G01N 30/06* (2013.01); *G01N 2030/009* (2013.01); *G01N 2030/062* (2013.01)

(58) Field of Classification Search
CPC ............................................... G01N 2030/009
See application file for complete search history.

(56) References Cited

FOREIGN PATENT DOCUMENTS

| CN | 102410833 A |   | 4/2012 |          |
|---|---|---|---|---|
| CN | 203101104   | * | 7/2013 |          |
| EP | 2584355 A1  | * | 4/2013 | ............... G01N 1/16 |
| JP | 2002540407 A | * | 11/2002 |         |

(Continued)

OTHER PUBLICATIONS

CN203101104 translation.*

(Continued)

*Primary Examiner* — Lisa M Caputo
*Assistant Examiner* — Alex T Devito
(74) *Attorney, Agent, or Firm* — Borden Ladner Gervais LLP; David Nauman

(57) ABSTRACT

The present disclosure provides an apparatus for sampling at least one analyte from a sampling fluid. The apparatus includes: a solid-phase microextraction (SPME) sampling instrument. A connector is attached to the SPME sampling instrument and is coupleable to an aerial drone. The apparatus includes a protective cover that is sized and shaped to at least partially surround the SPME sampling instrument. The SPME sampling instrument and the protective cover are movable in relation to each other between a protecting configuration and a sampling configuration. The SPME sampling instrument and the protective cover are (i) biased in the protecting configuration when the density of the fluid surrounding the SPME sampling instrument is less than the density of the sampling fluid; and (ii) biased in the sampling configuration when the density of the fluid surrounding the SPME sampling instrument is equal to or greater than the density of the sampling fluid.

20 Claims, 5 Drawing Sheets

(56) References Cited

FOREIGN PATENT DOCUMENTS

| | | | | |
|---|---|---|---|---|
| SU | 1472796 | * | 4/1989 | |
| WO | WO-2013135889 A1 | * | 9/2013 | ............... C12Q 1/04 |

OTHER PUBLICATIONS

Ahmadi et al., "Time Weighted Average Concentration Monitoring Based on Thin Film Solid Phase Microextraction", Environmental Science & Technology, Mar. 2017, vol. 51(7), pp. 3929-3937.

Bruheim, et al., "Thin-film Microextraction," Analytical Chemistry, 2003, vol. 75 (4), pp. 1002-1010.

Castendyk, et al., "Using Aerial Drones to Select Sample Depths in Pit Lakes," Mine Closure, 2019, pp. 1113-1126.

Chang, et al., "Development of a Multicopter-carried Whole Air Sampling Apparatus and Its Applications in Environmental Studies," Chemosphere, 2016, vol. 144, pp. 484-492.

Chen, et al., "On the Use of Multicopters for Sampling and Analysis of Volatile Organic Compounds in the Air by Adsorption/thermal Desorption GC-MS," Air Quality, Atmosphere & Health, 2018, vol. 11, pp. 835-842.

Cárdenas-Soracá, et al., "Development of Thin-film Solid-phase Microextraction Coating and Method for Determination of Artificial Sweeteners in Surface Waters," Taianta, 2020, vol. 211, pp. 120714.

Emmons, et al., "Optimization of Thin Film Solid Phase Microextraction and Data Deconvolution Methods for Accurate Characterization of Organic Compounds in Produced Water," Journel of Sepration of Science, 2019, vol. 43, pp. 1915-1924.

Grandy, et al., "Development of a Carbon Mesh Supported Thin Film Microextraction Membrane as a Means to Lower the Detection Limits of Benchtop and Portable GC/MS Instrumentation," Analytical Chemistry, 2015, vol. 88 (3), pp. 1-20.

Grandy et al., "Development of a Carbon Mesh Supported Thin Film Microextraction Membrane as a Means to Lower the Detection Limits of Benchtop and Portable GC/MS Instrumentation", Analytical Chemistry, Feb. 2016, vol. 88(3), pp. 1760-1767.

Grandy et al., "Development of a Hydrophilic Lipophilic Balanced Thin Film Solid Phase Microextraction Device for Balanced Determination of Volatile Organic Compounds", Analytical Chemistry, Oct. 2018, vol. 90(23), pp. 14072-14080.

Grandy, et al., "Development of a Standard Gas Generating Vial Comprised of a Silicon Oil-polystyrene/divinylbenzene Composite Sorbent," Journal of Chromatography. A, 2015, vol. 1410, pp. 1-8.

Grandy, et al., "Unique Solid Phase Microextraction Sampler Reveals Distinctive Biogeochemical Profiles Among Various Deep-sea Hydrothermal Vents," Scientific Reports, 2020, vol. 10 (1), pp. 1-16.

Harvey, et al., "Drone With Thermal Infrared Camera Provides High Resolution Georeferenced Imagery of Thewaikite Geothermal Area, New Zealand," Journal of Volcanology and Geothermal Research, 2016, vol. 325, pp. 61-69.

Jiang, et al., "Preparation of a Particle-loaded Membrane for Trace Gas Sampling," Analytical Chemistry, 2014, vol. 86(1), pp. 403-410.

Jimenez, et al., "Aerial Drone as a Carrier for Miniaturized Air Sampling Systems," Journal of Chromatography. A, 2019, vol. 1597 (2), pp. 202-208.

Koparan, et al., "Evaluation of a UAV-assisted Autonomous Water Sampling," Water, 2018, vol. 10 (5), pp. 1-16.

McGonigle, et al.,"Unmanned Aerial Vehicle Measurements of Volcanic Carbon Dioxide Fluxes," Geophysical Research Letters, 2008, vol. 35 (6), pp. 1-4.

Ouyang, et al., "One-calibrant Kinetic Calibration for on-site Water Sampling With Solid-phase Microextraction," Analytical Chemistry, 2009, vol. 81 (14), pp. 5629-5636.

Piri-Moghadam, et al., "Development and Validation of Eco-friendly Strategies Based on Thin Film Microextraction for Water Analysis," Journal of Chromatography. A, 2018, vol. 1579, pp. 1-32.

Piri-Moghadam et al., "Inter-laboratory Validation of a Thin Film Microextraction Technique for Determination of Pesticides in Surface Water Samples", Analytica Chimica Acta, Apr. 2017, vol. 964, pp. 74-84.

Poole, et al., "Solid Phase Microextraction on-fiber Derivatization Using a Stable, Portable, and Reusable Pentafluorophenyl Hydrazine Standard Gas Generating Vial," Analytical Chemistry, 2016, vol. 88 (13), pp. 1-21.

Qin, et al., "Comparison of Thin-film Microextraction and Stir Bar Sorptive Extraction for the Analysis of Polycyclic Aromatic Hydrocarbons in Aqueous Samples With Controlled Agitation Conditions," Journal of Chromatography. A, 2008, vol. 1196-1197, pp. 89-85.

Reyes-Garces et al., "Advances in Solid Phase Microextraction and Perspective on Future Directions," Analytical Chemistry, 2018, vol. 90(1), pp. 302-360.

Riazi Kermani and Pawliszyn., "Sorbent Coated Glass Wool Fabric as a Thin Film Microextraction Device", Analytical Chemistry, Oct. 2012, vol. 84 (21), pp. 8990-8995.

Risticevic, et al., "Recent Developments in Solid-phase Microextraction," Analytical and Bioanalytical Chemistry, 2009, vol. 393, pp. 781-795.

Truong, et al., "Rapid Screening of Volatile and Semi-volatile Organic Components in Cocoa Beans and Chocolate Products Using a Portable GC/MS System," Chromatography, 2017, pp. 43-46.

Vasiljevic, et al., "Miniaturized Spme Tips Directly Coupled to Mass Spectrometry for Targeted Determination and Untargeted Profiling of Small Samples," Talanta, 2019, vol. 199, pp. 689-697.

* cited by examiner ically, oil-and-gas process waters and tailings ponds may be dangerous to access (necessitating the use of personal protective equipment), require specialized training and/or certification, or any combination thereof.

APPARATUS FOR SOLID PHASE MICROEXTRACTION

CROSS REFERENCE TO RELATED APPLICATIONS

This application claims the benefit of priority to U.S. Provisional Patent Application No. 62/846,033, filed May 10, 2019, the disclosure of which is incorporated by reference herein in its entirety.

FIELD

This application relates to devices useful for solid phase microextraction of analytes from a fluid using an aerial drone.

BACKGROUND

The following paragraphs are not an admission that anything discussed in them is prior art or part of the knowledge of persons skilled in the art.

Solid phase microextraction (SPME) is an approach for sample preparation that may be used in various analytical methods. SPME devices include an extraction coating present on a support. The extraction coating includes adsorptive particles. Exposure of the SPME device to a matrix, for a certain period of time, extracts and enriches analytes contained in the sample matrix.

The SPME process is governed by the partitioning of analytes from the matrix onto or into the extraction phase, and extraction efficiency of an analyte depends on the analyte's affinity toward the adsorptive particles present in the extraction coating.

After extraction and enrichment of the analytes onto or into the extraction phase, the SPME device may be placed in an analytical device where the analytes are desorbed and analyzed.

Thin-film solid phase microextraction (TF-SPME) is a variant of SPME in which the extraction phase is coated on a thin sheet, such as a carbon-fabric sheet or a metal sheet.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

There is an increasing demand for sampling fluids at locations that are remote and/or difficult to access in person. Examples of such fluids include polluted water reservoirs, such as mine tailings or hydraulic fracking ponds. Although samples of such fluids might be obtained and transported back to the analytical instrument, obtaining fluid samples in person can be difficult and/or time consuming. Additionally, oil-and-gas process waters and tailings ponds may be dangerous to access (necessitating the use of personal protective equipment), require specialized training and/or certification, or any combination thereof.

Aerial drones may be used to more easily and quickly access fluids located at locations that are remote and/or difficult to access in person, reducing the user's exposure to the sampling fluids. Solid phase microextraction is a technique that may be paired with aerial drone sampling, and used for on-site extraction of analytes from the fluid as it is compact and of low weight. A solid phase microextraction apparatus can be flown by drone from the take-off location to the sampling site, and then to the landing location. The analytes from the sampling fluid that are adsorbed onto the SPME coating can be subsequently desorbed and analyzed in an analytical instrument.

In one aspect, the present disclosure provides an apparatus for sampling at least one analyte from a sampling fluid. The apparatus includes: a solid-phase microextraction (SPME) sampling instrument. A connector is attached to the SPME sampling instrument and is coupleable to an aerial drone. The apparatus includes a protective cover that is sized and shaped to at least partially surround the SPME sampling instrument.

The SPME sampling instrument and the protective cover are movable in relation to each other between a protecting configuration and a sampling configuration. The SPME sampling instrument and the protective cover are biased in the protecting configuration when the density of the fluid surrounding the SPME sampling instrument is less than the density of the sampling fluid. The SPME sampling instrument and the protective cover are biased in the sampling configuration when the density of the fluid surrounding the SPME sampling instrument is equal to or greater than the density of the sampling fluid.

The apparatus may include at least one floatable component having a density less than the density of the sampling fluid. In some examples, the protective cover may be fixed in relation to the aerial drone, and the floatable component biases the SPME sampling instrument in the sampling configuration when the density of the fluid surrounding the SPME sampling instrument is equal to or greater than the density of the sampling fluid. In other examples, the SPME sampling instrument may be fixed in relation to the aerial drone, and the floatable component biases the protective cover in the sampling configuration when the density of the fluid surrounding the SPME sampling instrument is equal to or greater than the density of the sampling fluid.

In another aspect, the present disclosure provides an apparatus for sampling at least one analyte from a sampling fluid. The apparatus includes a solid-phase microextraction (SPME) sampling instrument that includes a support and an SPME coating covering at least a portion of the support; and a protective cover that at least partially surrounds the SPME sampling instrument. The protective cover defines at least one liquid inlet in fluid connection with the SPME sampling instrument. The support, the protective cover, or both is directly or indirectly coupleable to an aerial drone.

In yet another aspect, the present disclosure provides an aerial drone coupled to an apparatus according to the present disclosure. The aerial drone is floatable on the sampling fluid.

In some examples, when the drone is floating on the sampling fluid the SPME sampling instrument and the protective cover are biased in the sampling configuration.

In other examples, the support and/or the protective cover is coupled to the aerial drone to position the liquid inlet and the SPME sampling instrument in the sampling fluid when the drone is floating on the sampling fluid.

BRIEF DESCRIPTION OF THE DRAWINGS

Embodiments of the present disclosure will now be described, by way of example only, with reference to the attached Figures.

DETAILED DESCRIPTION

Figure 1:
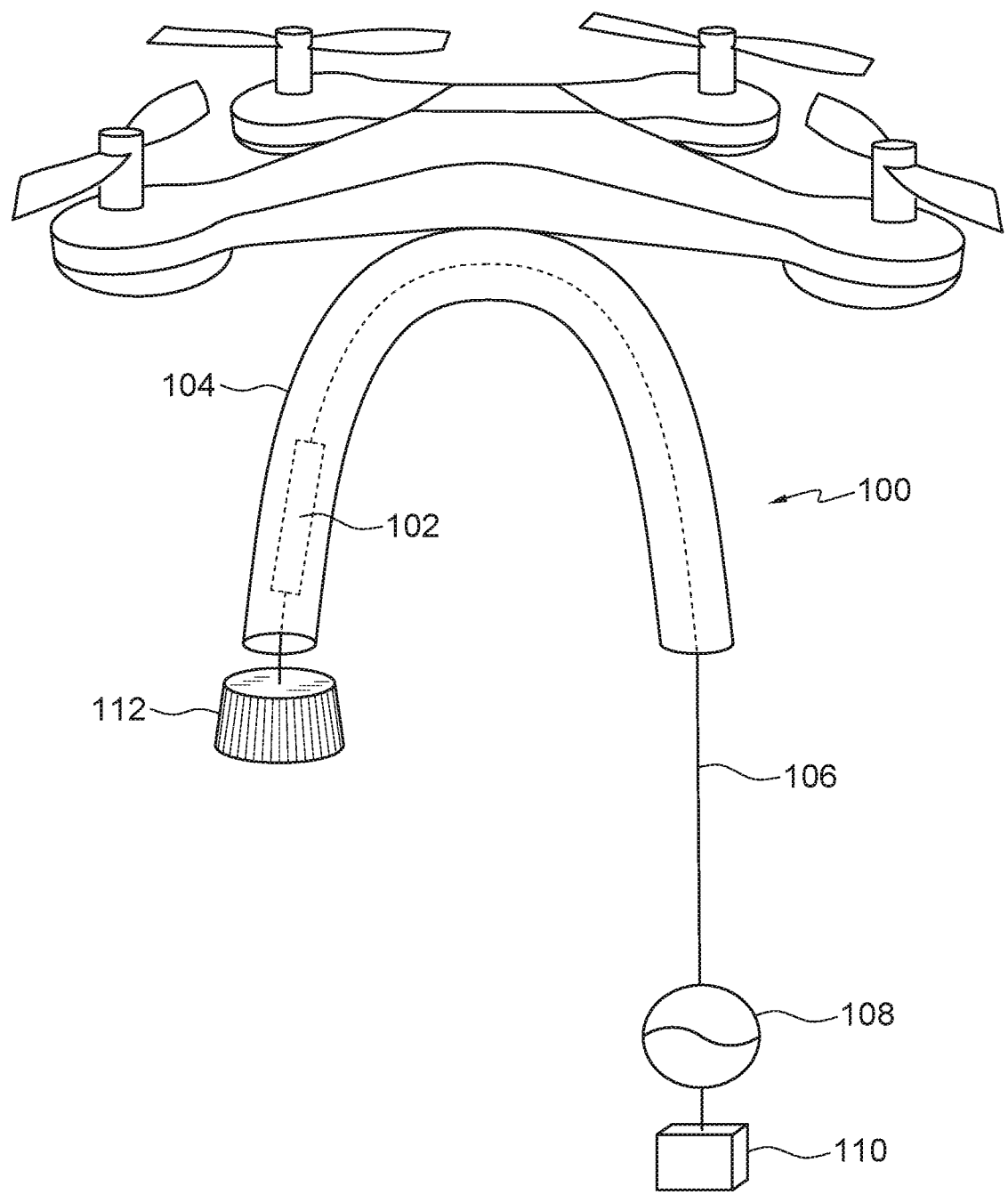
FIG. 1 is an illustration of an exemplary apparatus according to the present disclosure in a protecting configuration.

In one aspect, the present disclosure provides an apparatus for sampling at least one analyte from a sampling fluid. The sampling fluid may be an aqueous liquid, such as liquid from a lake, river, ocean, or from a natural or artificial reservoir. The sampling fluid may include, for example, mine tailings, liquid from hydraulic fracking operations, or liquid from agricultural or industrial operations.

The apparatus includes at least one solid-phase microextraction (SPME) sampling instrument. A connector is attached to the SPME sampling instrument and is coupleable, directly or indirectly, to an aerial drone. The connector may be, for example, a monofilament fibre (such as a fishing line) or a wire. The apparatus includes a protective cover that is sized and shaped to at least partially surround the SPME sampling instrument.

The SPME sampling instrument may include a support and an SPME coating covering at least a portion of the support. The SPME instrument may include one or more internal calibrants. The SPME instrument may be a thin-film solid phase microextraction (TF-SPME) instrument. In a TF-SPME instrument, the support may be a carbon-fiber fabric and the SPME coating may be impregnated on the carbon-fiber fabric. One example of TF-SPME is disclosed in Grandy, J. J.; Boyaci, E.; Pawliszyn, J. *Anal. Chem.* 2016, 88 (3).

SPME coatings that may be used in apparatuses of the present disclosure are disclosed in, for example, U.S. Pat. No. 6,588,255 issued on Jul. 8, 2003; U.S. Pat. No. 6,941,825 issued on Sep. 13, 2005; U.S. Pat. No. 7,384,794 issued Jun. 10, 2008; U.S. Pat. No. 8,598,325 issued Dec. 3, 2013; and U.S. Pat. No. 10,545,077 issued on Jan. 28, 2020. The contents of these references are incorporated herewith by reference.

Briefly, the SPME coatings can be prepared by covering the support with extractive material and a bonding polymer. The SPME coating may be covered by a protective polymer, such as polyacrilonitrile, a fluorocarbon polymer such as polyvinylidene fluoride (PVDF), polydimethylsiloxane (PDMS), or polypyrrole (PPY). The extractive material may be any extractive particles currently used in solid phase extraction or affinity chromatography (e.g. high pressure liquid chromatography), depending on the nature of the compound being extracted, in a similar manner than affinity chromatography relies on different particles for separating various compounds. Examples of extractive materials that may be used in SPME devices include: hydrophilic-lipophilic-balance (HLB) particles, divinylbenzene particles, C-18/silica particles, reverse-phase-amide/silica particles, and HS-F5/silica particles. C-18/silica particles would be understood by one of skill in the art to comprise silica particles derivatized with a hydrophobic phase, the hydrophobic bonded phase comprising octadecyl. For RP-amide-silica particles, the bonded phase comprises palmitamido-propyl. For HS-F5-silica particles, the bonded phase comprises pentafluorophenyl-propyl. Other exemplary materials include: normal-phase silica particles, C-1/silica particles, C-4/silica particles, C-6/silica particles, C-8/silica particles, C-30/silica particles, phenyl/silica particles, cyano/silica particles, diol/silica particles, ionic liquid/silica particles, molecular imprinted polymer particles, carboxen 1006 particles, carbowax particles, divinylbenzene (DVB) particles, octadecylsilane particles, nanoparticles, processed mineral based particles, carbon nanotubes, functionalized-carbon nanotubes, graphene, graphene oxide, functionalized-graphene, and quantum dots. Mixtures of particles can also be used in the coatings. The particles can be inorganic (e.g. silica), organic (e.g. carboxen or divinylbenzene) or inorganic/organic hybrid (e.g. silica and organic polymer). The bonding polymer may be: PDMS, polyacrylonitrile (PAN), polyethylene glycol, polypyrrole, derivatised cellulose, polysulfone, polyamide, a fluorocarbon polymer, or a combination thereof. Examples of fluorocarbon polymers include polyvinylidene fluoride (PVDF), polytetrafluoroethylene (PTFE), fluorinated ethylene-propylene (FPE, tradename Teflon®), fluoroelastomer [tetrafluoroethylene-propylene] (FEPM, tradename AFLAS®), and any combination thereof.

The SPME sampling instrument and the protective cover are movable in relation to each other between a protecting configuration and a sampling configuration.

The SPME sampling instrument and the protective cover are biased in the protecting configuration when the density of the fluid surrounding the SPME sampling instrument is less than the density of the sampling fluid. For example, when the sampling fluid is pond water (density of about 1 g/cm$^3$), the SPME sampling instrument and the protective cover are biased in the protecting configuration when the SPME sampling instrument is surrounded by air (density from about 0.8 to about 1.4 kg/m$^3$ depending on conditions), such as when the drone is carrying the SPME sampling instrument from the take-off location to the sampling site. The SPME sampling instrument and the protective cover are biased in the sampling configuration when the density of the fluid surrounding the SPME sampling instrument is equal to or greater than the density of the sampling fluid. For example, when the sampling fluid is pond water (density of about 1 g/cm$^3$), the SPME sampling instrument and the protective cover are biased in the sampling configuration when the SPME sampling instrument is surrounded by the pond water.

In the context of the present disclosure, it should be understood that a protective cover prevents or reduces adsorption of analytes from the environment that the drone is flying through between the take-off location and the sampling site, or reduces or prevents extracted analytes from being lost to the air during flight after sample collection, or both. Reduction of extraction of contaminants present in the air, or reduction of extracted analytes from being lost to the air, is in comparison to an otherwise identical SPME sampling instrument that lacks the protective cover. The protective cover may at least partially surround the SPME sampling instrument when the apparatus is in the protecting configuration, and/or may substantially shield the SPME sampling instrument from the environment when the apparatus is in the protecting configuration. In this manner, the protective cover may sufficiently isolate the SPME sampling instrument from the environment to substantially shield the SPME sampling instrument from environmental effects that would lead to inaccurate results. It should be understood that the protective cover does not need to completely surround the SPME sampling instrument, or completely isolate the SPME sampling instrument from the environment in order to sufficiently prevent or reduce adsorption of analytes from the environment that the drone is flying through.

In the context of the present disclosure, it should be understood that the sampling configuration allows the SPME sampling instrument to contact the sampling fluid and adsorb analytes from the sampling fluid. This may be achieved by moving the SPME sampling instrument or the protective cover to at least partially expose the SPME sampling instrument to the sampling fluid, and/or by revealing a liquid inlet that is in fluid communication with the SPME sampling instrument allowing the sampling fluid to contact the SPME sampling instrument.

Although the SPME sampling instrument and the protective cover are movable in relation to each other, in some examples the protective cover is fixed in relation to the aerial drone and in other examples the SPME sampling instrument is fixed in relation to the aerial drone. For example, the protective cover may be fixed in relation to the drone and the SPME sampling instrument is movable between the protecting and sampling configurations. In other examples, the SPME sampling instrument may be fixed in relation to the drone and the protective cover is movable between the protecting and sampling configurations. It should be understood that "fixed in relation to the drone" does not require that the SPME sampling instrument or protective cover be attached to the drone in an inflexible manner. Rather, the expression should be understood to mean that the SPME sampling instrument or protective cover do not move between the protecting and sampling configurations.

The apparatus may avoid the need for motors or other external applications of force by using the change in density of the fluid surrounding the SPME sampling instrument to move the SPME sampling instrument and the protective cover between the protecting and sampling configurations. For example, the apparatus may include at least one floatable component having a density less than the density of the sampling fluid. Moving the SPME sampling instrument from the low-density fluid (e.g. the air) to the sampling fluid (e.g. a tailings pond), for example by landing the drone on the sampling fluid, uses the floatable component to move the SPME sampling instrument or the protective cover from the protecting configuration to the sampling configuration. The reverse, for example by having the drone take off from the sampling fluid, uses the weight of the components to move the SPME sampling instrument or the protective cover from the sampling configuration to the protecting configuration.

Apparatuses according to the present disclosure may additionally include a cap that at least partially obstructs an opening in the protective cover when the SPME sampling instrument and the protective cover are biased in the protecting configuration. The cap may be attached to the connector or to the SPME sampling instrument at an end distal to the aerial drone. In some examples, the cap may have a sufficient weight and density to help bias the SPME sampling instrument in the sampling configuration.

The protective cover used in an apparatus according to the present disclosure may be tubular. The protective cover may include a gas-chromatography liner suitable for use in a thermal desorption system. The gas-chromatography liner and the SPME sampling instrument may be removable in combination.

In some examples, the protective cover may be fixed in relation to the aerial drone, and the floatable component biases the SPME sampling instrument in the sampling configuration when the density of the fluid surrounding the SPME sampling instrument is equal to or greater than the density of the sampling fluid. The apparatus may additionally include a counterweight to the SPME sampling instrument, where the connector is a flexible linker and the SPME sampling instrument and the counterweight are connected to different ends of the linker, and where the floatable component is on the same end as the counterweight.

The floatable component may have a buoyancy force in the sampling fluid that is sufficient to support the counterweight in the sampling fluid. The floatable component may have a buoyancy force in the sampling fluid that is sufficient to bias the SPME sampling instrument to the sampling configuration when the density of the fluid surrounding the SPME sampling instrument is equal to or greater than the density of the sampling fluid.

The floatable component may be separate from the counterweight, or the floatable component may include the counterweight.

Figure 2:
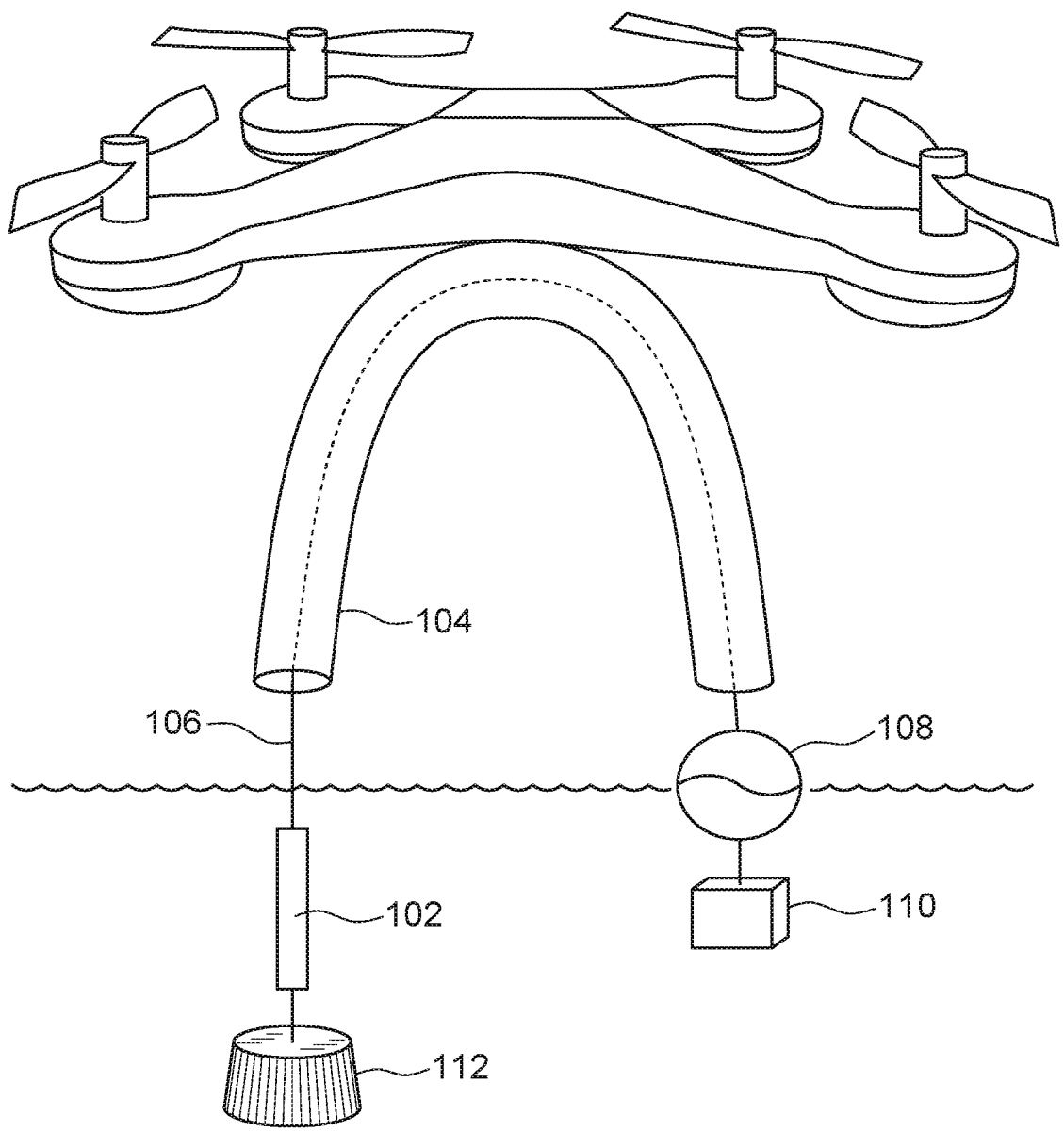
FIG. 2 is an illustration of the exemplary apparatus of FIG. 1 in a sampling configuration.

One specific example of an apparatus according to the present disclosure is illustrated in FIGS. 1 and 2. The apparatus (100) includes an SPME sampling instrument (102) and a protective cover (104) that is sized and shaped to be able to substantially surround the SPME sampling instrument (102). The protective cover (104) is fixed to the drone. The apparatus includes a connector (106) that is attached to the SPME sampling instrument (102). The connector (106) indirectly couples the SPME sampling instrument (102) to the drone by passing through the protective cover (104) and attaching to a float (108) and a counterweight (110). The SPME sampling instrument (102) is attached to a cap (112) that is sized to engage with the protective cover (104).

FIG. 1 illustrates the apparatus in the protecting configuration. The cap (112) engages with the protective cover (104), and the protective cover (104) substantially surrounds the SPME sampling instrument (102). The connector (106) passes through the protective cover (104) and is attached to the float (108) and the counterweight (110), both of which pull the SPME sampling instrument (102) into the protective cover (104) when SPME sampling instrument (102) is not in the sampling fluid, for example when the drone is flying or otherwise not landed on the sampling liquid. In this manner, the SPME sampling instrument (102) is in the protecting configuration.

FIG. 2 illustrates the apparatus in the sampling configuration, for example when the drone has landed on the sampling fluid. The float (108) has a sufficient buoyancy in the sampling fluid to support the counterweight (110) and allow the cap (112) and SPME sampling instrument (102) to exit the protective cover (104). In this manner, the SPME sampling instrument (102) is in a sampling configuration and is capable of absorbing analytes from the sampling liquid.

In other examples, the SPME sampling instrument may be fixed in relation to the aerial drone, and the floatable component biases the protective cover in the sampling configuration when the density of the fluid surrounding the SPME sampling instrument is equal to or greater than the density of the sampling fluid.

The floatable component may have a buoyancy force in the sampling fluid that is sufficient to support the protective cover in the sampling fluid. The floatable component may have a buoyancy force in the sampling fluid that is sufficient to bias the protective cover to the sampling configuration when the density of the fluid surrounding the SPME sampling instrument is equal to or greater than the density of the sampling fluid.

The protective cover may include the floatable component, or may be attached to the floatable component.

Figure 3:
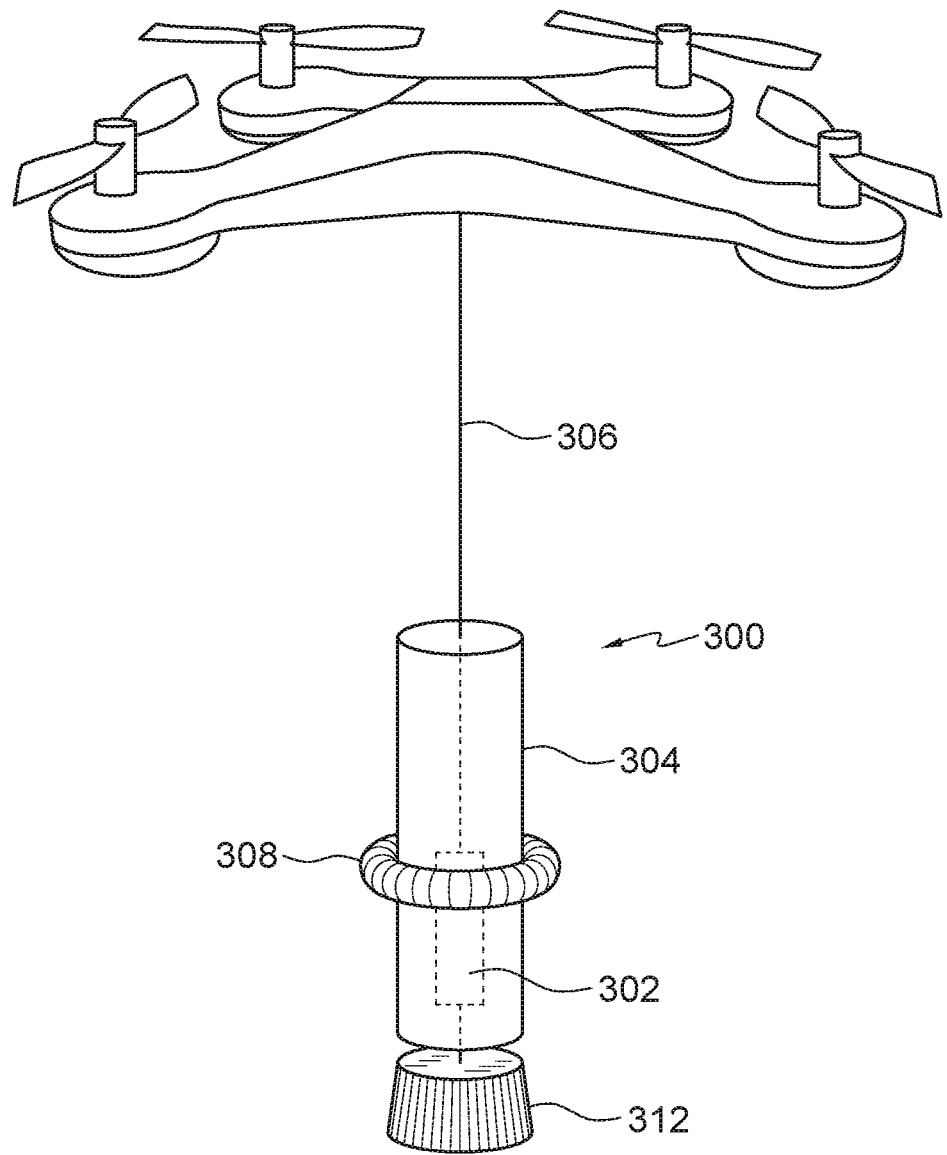
FIG. 3 is an illustration of another exemplary apparatus according to the present disclosure in a protecting configuration.
Figure 4:
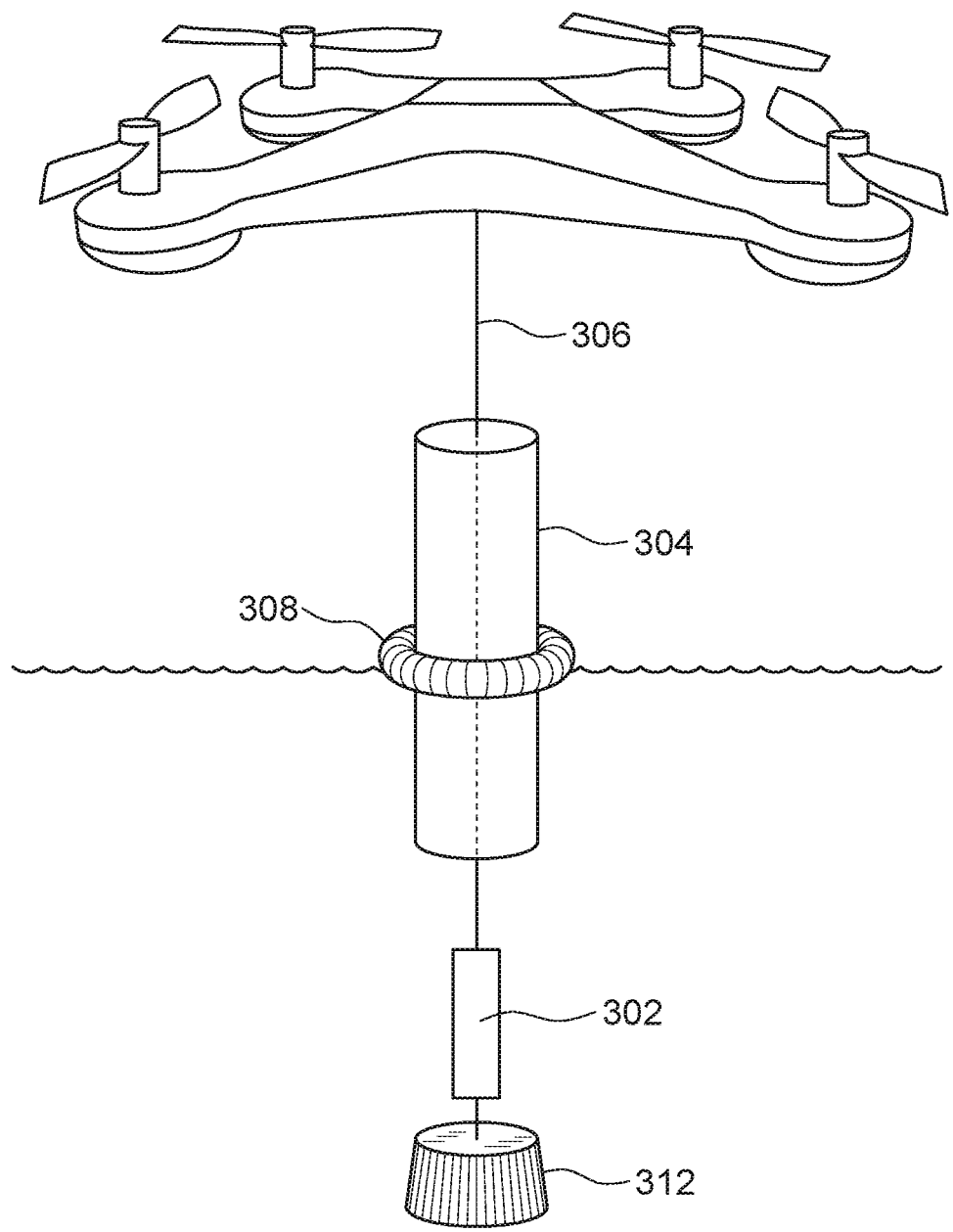
FIG. 4 is an illustration of the exemplary apparatus of FIG. 3 in a sampling configuration.

A specific example of an apparatus according to the present disclosure is illustrated in FIG. 3 (the exemplary apparatus in the protecting configuration) and FIG. 4 (the exemplary apparatus in the sampling configuration). Many of the features of the apparatus illustrated in FIGS. 3 and 4 are similar to those shown and described above with reference to FIGS. 1 and 2, and are not described again in detail to avoid obscuring the description. Where similar features are described with reference to FIGS. 3 and 4, similar reference numerals are used, raised by 200.

In the apparatus (300), the SPME sampling instrument (302) is coupled to the drone through the connector (306), which is fixed to the drone. The protective cover (304) is slidably engaged along the connector (306), and is sized and shaped to be able to substantially surround the SPME sampling instrument (302) and to engage with the cap (312) when in the protecting configuration (illustrated in FIG. 3). The protective cover (304) may have a density that allows the cover to float in the sampling fluid or, as illustrated, the protective cover (304) may be attached to a float (308). The float (308) has a sufficient buoyancy in the sampling fluid to float the protective cover (304) at the surface of the sampling fluid (as illustrated in FIG. 4), and allow the SPME sampling instrument (302) to exit the protective cover (304). In this manner, the SPME sampling instrument (302) is in a sampling configuration and is capable of absorbing analytes from the sampling liquid.

In an alternative example, the present disclosure provides an apparatus that includes a solid-phase microextraction (SPME) sampling instrument that includes a support and an SPME coating covering at least a portion of the support; and a protective cover that at least partially surrounds the SPME sampling instrument. The protective cover defines at least one liquid inlet in fluid connection with the SPME sampling instrument. The support, the protective cover, or both are directly or indirectly coupleable to an aerial drone.

Figure 5:
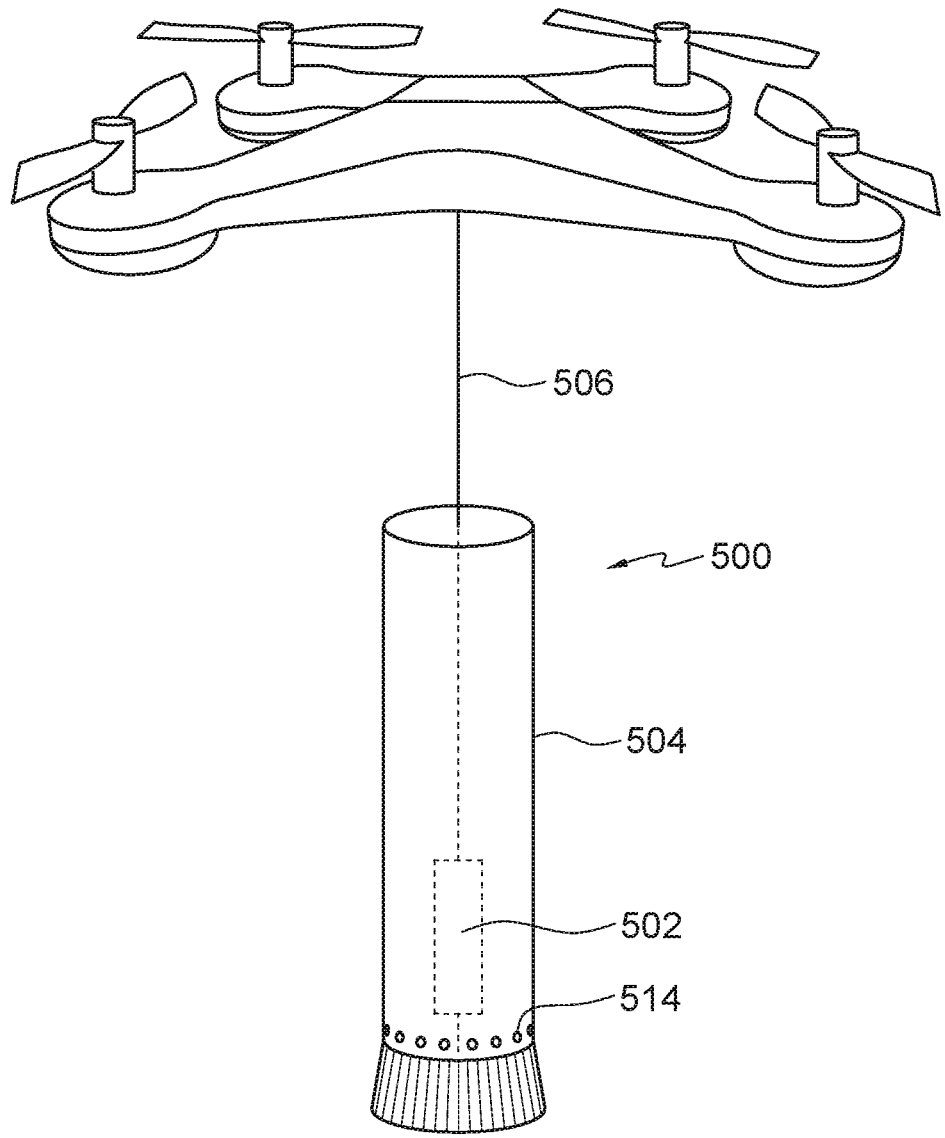
FIG. 5 is an illustration of another exemplary apparatus according to the present disclosure.

One specific example of an apparatus according to the present disclosure is illustrated in FIG. 5. Many of the features of the apparatus illustrated in FIG. 5 are similar to those shown and described above with reference to FIGS. 1 to 4, and are not described again in detail to avoid obscuring the description. Where similar features are described with reference to FIGS. 1 to 4, similar reference numerals are used, raised by 400 with respect to FIGS. 1 and 2.

In the apparatus (500), the SPME sampling instrument (502) is coupled to the drone through the connector (506), which is fixed to the drone. The protective cover (504) substantially surrounds the SPME sampling instrument (502) and is also coupled to the drone. The protective cover (504) defines at least one liquid inlet (514) that is in fluid communication with the SPME sampling instrument (502). When the drone places the SPME sampling instrument (502) in the sampling fluid, for example when the drone has landed on the sampling fluid, the sampling fluid flows through the liquid inlet (514) and contacts the SPME sampling instrument (502). In this manner, the SPME sampling instrument (502) is capable of absorbing analytes from the sampling liquid. When the drone removes the SPME sampling instrument (502) from the sampling fluid, for example when the drone takes off from the sampling fluid to fly back to the landing site, the sampling fluid flows out from the liquid inlet (514).

In another aspect, the present disclosure provides an aerial drone coupled to an apparatus according to the present disclosure. The aerial drone is floatable on the sampling fluid. In some examples, when the drone is floating on the sampling fluid the SPME sampling instrument and the protective cover are biased in the sampling configuration. In other examples, the support and/or the protective cover is coupled to the aerial drone to position the liquid inlet and the SPME sampling instrument in the sampling fluid when the drone is floating on the sampling fluid.

EXAMPLES

Hydrophobic-lipophilic balance (HLB) particles in PDMS were used as the coating on a carbon mesh support. The poly(divinylbenzene-co-N-vinyl-pyrrolidone) skeleton structure of the HLB/PDMS coating provides a balance of hydrophobic and hydrophilic inter-molecular interactions, and is, therefore, useful for broad polarity, untargeted analysis of environmental contaminants in water. The HLB/PDMS thin-film SPME sampling instrument was used in the apparatus illustrated in FIGS. 1 and 2. Analytes adsorbed on the TF-SPME sampling instrument were desorbed and analyzed on a hand-portable GC-MS instrumentation. This combination allowed for sampling, extraction, and analyte identification to be performed entirely on-site. In-lab validation of the drone-based sampling apparatus showed that the TF-SPME membranes were well sealed by the device and thus had non-significant analyte loss and negligible contamination from the atmosphere.

Reagents and Supplies

All analytical grade standards of the McReynolds mixture, including benzene, 2-pentanone, 1-nitropropane, pyridine, 1-pentanol, octane, dodecane, and hexadecane were purchased from Millipore-Sigma (Oakville, ON, Canada). The resulting standard headspace generating vials and jars were prepared using methods previously published in Grandy, J. J.; Gómez-Rios, G. A.; Pawliszyn, J.; Gomez-Rios, G. A.; Pawliszyn, J. *J. Chromatogr. A* 2015, 1410, 1-8.

HPLC-grade methanol, acetone, and acetonitrile were obtained from Caledon Laboratories Ltd. (Georgetown, ON, Canada). The high-density PLOT PDMS was provided by Supelco (Bellefonte, Pa., U.S.A.). The 400 µm woven carbon fabric (Panex 30) was purchased from Zoltec (St Louis, Mo., USA). Liquid nitrogen and ultrahigh-purity helium were supplied by Praxair (Kitchener, ON, Canada). SPME fibre assemblies and polystyrene-DVB resin (XAD-4) were purchased by Millipore-Sigma (Missasuaga, Ontario, Calif.). A 19-gauge Tenax/Car needle trap device was purchased from PerkinElmer (American Fork, Utah, USA). A KJLC 704 silicon pump fluid (tetramethyl tetraphenyl trisiloxane) was ordered from Kurt J. Lesker Company (Toronto, ON, Canada).

1.33 µm diameter HLB particles were prepared in the laboratory using methods previously published in Vasiljevic, T.; Singh, V.; Pawliszyn, J. *Talanta* 2019, 199, 689-697. The HLB/PDMS TF-SPME membranes were prepared using methodologies published in Grandy, J. J.; Boyaci, E.; Pawliszyn, J. *Anal. Chem.* 2016, 88 (3), 1760-1767; and in Grandy, J. J.; Singh, V.; Lashgari, M.; Gauthier, M.; Pawliszyn, J. *Anal. Chem.* 2018, 90, 14072-14080.

Instrumentation: Benchtop GC-MS

An Agilent 7890 GC and a 5977 quadrupole MS (Agilent Technologies, CA U.S.A.) were used for separation and quantitation, respectively. The sample introduction was achieved using a Gerstel MPS-Robotic autosampler, which was used to transfer TF-SPME devices to the thermal desorption unit (TDU1) cooling injection system (CIS4) (GERSTEL, Mülheim an der Ruhr, GE) for membrane desorption. Chromatographic separations on the Agilent 7890-5977 were performed on a 30 m×0.25 mm I.D.×0.25 µm DB5-MS fused silica column (Agilent, Mississauga, ON, CA). Helium served as the carrier gas at a flow rate of 1.0 mL min$^{-1}$. The column temperature was initially held at 40° C. for 2 min, ramped to 140° C. at a rate of 8° C. min$^{-1}$, then ramped to 250° C. at 40° C. min$^{-1}$, and kept for 2 min. The MS transfer line, quadrupole, and source temperatures were set at 275, 150, and 230° C., respectively. Gas-phase ions were generated using electron impact ionization at 70 eV, and the quadrupole was operated in SIM mode, selecting ions 78, 86, 43, 79, 55, and 85 m/z for benzene, 2-pentanone, 1-nitropropane, pyridine, 1-pentanol, and the n-alkanes, respectively.

To perform desorption from the 20 mm×4.75 mm×400 µm (L×W×T) TF-SPME membranes, an inert glass bead was inserted into a tapered 5 mm I.D. glass TD tube. Desorption was carried out at 270° C. with a helium stripping gas flow of 60 mL min$^{-1}$ for 5 min. The desorbed analytes were cryo-focused at −120° C. within the CIS module. Following desorption, the CIS module was then ramped to a temperature of 270° C. at a rate of 12° C. s$^{-1}$, to enable analyte transfer to the Agilent 7890 GC column for separation and quantitation.

Instrumentation: Portable GC-MS

The on-site separation and identification of unknown analytes extracted from surface water using the TF-SPME drone sampling apparatus were performed using a Tridion-9 portable GC-MS equipped with an experimental, planar, low thermal mass non-polar GC column (Perkin Elmer, American Fork, Utah, USA). (Truong, T. V; Lee, E.; Thomas, R. 2017, 43-46.) Helium served as the carrier gas at a flow rate of approximately 0.3 mL min$^{-1}$. The GC column was initially held at 50° C. for 10 s and then ramped to 290° C. at 2° C. s$^{-1}$, where the temperature was held for an additional 60 s. Transfer of the compounds extracted by the TF-SPME membranes onto the 19-gauge Tenax/Carboxen NTD was performed using a method previously validated in J. *Anal. Chem.* 2016, 88 (3) that employs an SPS-3 high volume desorption module (PerkinElmer American Fork, Utah) at a temperature of 250° C. for 5 min, using a helium flow of 35 mL min$^{-1}$. To maximize sensitivity while maintaining an acceptable peak shape for early eluting compounds, desorption from the Tenax/CAR 19-gauge needle trap, used to transfer analytes from the TF-SPME membranes, was performed at 280° C. for 0.8 s in splitless mode, followed by the opening of the 10:1 split for 10 s and then further opening of the 50:1 split for a final 20 s. The ion-trap heater was operated at 180° C., and the transfer-line was held at 250° C. during the analysis. Ionization was performed using a 70 eV electron gun and an electron impact ion source, while the ion trap was operated in full scan mode set in a range of 43-500 m/z.

Drone-Based Water Sampling Apparatus

A Turbo-X brand Skyline 1 ROV drone was purchased from an electronics shop in Guangzhou China for 400 RMB. This drone was tested to have an additional lift capacity of 50 g and a flight range of 75 meters limited by the RF communication range. Lightweight "pontoons" were constructed out of interlocking pool noodles purchased from a local department store.

The apparatus illustrated in FIGS. 1 and 2 was constructed primarily out of fishing supplies including fluorocarbon fishing line, lead sinkers and polystyrene floaters purchased from Sail outdoors store (Cambridge, ON, Canada). The apparatus used stainless steel split cotter pins, fishing swivels, and fluorocarbon fishing lines to connect the TF-SPME membrane to two differently massed sinkers, one of which was made buoyant using a floater.

Specifically, a stainless steel split cotter pin was soldered within the eye of a 1.75 g bullet sinker which could then be clipped onto a thin film membrane. On the other end of the membrane, the fluorocarbon fishing line was attached using another cotter pin or fishing swivel. The fishing line was then run through 6 mm inner diameter PTFE tubing which was attached to the base of the drone using one of the pre-existing screws on the drone. A heavier 3.5 g bell sinker and polystyrene floater were attached to the other end of the fishing line using a fishing swivel. This configuration allows the heavier (3.5 g) sinker to pull the TF-SPME membrane into the PTFE tubing via gravity during the flight while the buoyant polystyrene floater keeps the heavier (3.5 g) sinker from sinking when the drone is floating on the surface of the water. This allows the lighter (1.75 g) bullet sinker to pull the SPME membrane out of the PTFE tube and into the water for sampling.

The total mass of the apparatus was just under 12 grams, which "toy" drones are able to lift. The floating design allowed the drone to conserve battery power while sampling. It was also found that the drone was sufficiently stable on the water to be repositioned during sampling without needing to take off.

Validation of TF-SPME Storage Stability

The effectiveness of the sampling method was evaluated by running handling blanks in-lab to demonstrate that the membranes were sufficiently sealed from the atmosphere, and to demonstrate that moving the membranes in and out of the PTFE tubing would not add significantly to a potential background signal.

To perform this comparison the following TF-SPME test samples were performed: A) two HLB/PDMS TF-SPME membrane blanks with no handling as a reference, B) four TF-SPME membrane blanks with normal in-lab handling (in and out of the thermal desorption tubes wearing gloves, C) four HLB/PDMS TF-SPME membranes that had been sealed in different sampling apparatuses that were hung outside for 15 minutes, and D) two HLB/PDMS membranes that were placed in 2 mL glass autosampler unsealed vials and left outside for 15 minutes.

Afterward, the analyte storage capabilities of the sampling apparatuses were evaluated using modified McReynolds standards. Three sets of four TF-SPME replicate samples of 1 ppb McReynolds standards were prepared in 2 L of deionized water in 2 L amber glass bottles (Qorpak, Bridgeville Pa., USA). Before extraction, these samples were stirred on an orbital shaker for one minute at 100 rpm. HLB/PDMS TF-SPME extractions were performed by hanging the sampling apparatuses in the bottle for 10 min at room temperature, stirring at 50 rpm on an orbital shaker. Following sampling, the first set of 4 membranes were then immediately placed in desorption tubes and analyzed on the benchtop GC-MS. The second set of 4 membranes were removed from the water and hung vertically to seal them in the sampling apparatuses for 10 minutes at room temperature prior to desorption and analysis. Lastly, the third set of 4 membranes were removed from the water, hung vertically to seal them in the sampling apparatuses for 10 minutes at room temperature and then transferred and stored in glass TD tubes on dry ice for four hours before desorption and analysis, Validation of VOC Storage Stability on Membrane Following Simulated Drone Extractions Handling blanks were run to demonstrate that the sampling apparatus protects the membranes during flight, such that that the TF-SPME membranes are not contaminated by compounds in the atmosphere or subject to detectable compound loss following analytical extractions from water samples.

There was no significant difference between blank desorption of unused membranes, those given mock normal handling, or membranes placed into the sampling apparatus for 10 minutes and hung outside. This indicates that the SPME sampling instruments were not contaminated by the atmosphere when they were on the drone for flight.

bicarbonate) and a calcium hardness 500 ppm. Following sampling, the drone was then flown back to the aluminum foil and then the membranes were immediately removed and placed in 3.5" stainless steel sorbent tubes for onsite desorption and analysis using the Tridion-9 portable GC-MS instrument.

In terms of analytical performance, the % RSDs for the 7 chlorination by-products tentatively identified in Table 1 were quite reasonable, ranging between 2%-16% for two membranes that were deployed during the same flight.

TABLE 1

On-site tentative identification and repeatability of chlorination by-products extracted by two TF-SPME drone samplers deployed simultaneously in hot-tub water. Retention time (RT), retention time index (RTI).

| Compound | RT (s) | RTI (calc) | RTI (lit) | Run 1 | Run 2 | Avg. | SD | % RSD |
|---|---|---|---|---|---|---|---|---|
| Trichloromethane* | 25.60 | N/C | 615 | 3330 | 2925 | 3128 | 286 | 9 |
| Dichloroacetonitrile* | 38.28 | 718 | 693 | 4131 | 3558 | 3845 | 405 | 11 |
| 1,1,1-trichloro-2-propanone | 54.39 | 853 | 844 | 782 | 843 | 813 | 43 | 5 |
| 2,2,2 trichloroethanol | 59.01 | 894 | 858 | 1123 | 986 | 1055 | 97 | 9 |
| Benzonitrile | 68.98 | 993 | 989 | 1364 | 1635 | 1500 | 192 | 13 |
| 3-methyl indene | 82.55 | 1146 | 1155 | 1545 | 1600 | 1573 | 39 | 2 |
| Benzyl nitrile | 83.55 | 1158 | 1154 | 13444 | 16815 | 15130 | 2384 | 16 |

*Identity confirmed by analytical standard

In addition to ensuring the apparatus prevented the membranes from being contaminated, it was also important to ensure there would be negligible sample loss during flight. Many aqueous environmental contaminants tend to be volatile, and so the sampling apparatus was tested to determine if extracted analytes desorbed during the short return flight after deploying the membranes. The in-lab extractions were done using water spiked with analytes possessing varying polarity and volatility. These compounds were spiked at a low enough concentration (1 ppb) to mimic typical trace concentrations present in the environment. A ten-minute wait was implemented to mimic a flight back to shore after sampling. The additional wait in sealed TDU tubes on dry ice was implemented to mimic bringing samples back to the lab after sampling on-site.

These seal tests indicated negligible depletion of McReynolds standards after being sealed in the drone sampler at room temperature. Moreover, no notable loss of analytes was observed from membranes that were sealed in TDU tubes on dry ice. Hence, the sampling apparatus proved to be capable of preventing sample loss. Most convincingly, benzene, the most volatile compound tested, did not deplete between the various tests. The sampling proved to be quite repeatable, with most % relative standard deviations (% RSDs) under 10%.

Performance Validation Trial: Determination of Chlorination By-Products from a Hot Tub The TF-SPME drone-enabled sampling apparatus was also tested in a trial run using water in a hot-tub. Two HLB/PDMS TF-SPME membranes were used for the sampling apparatus. The drone was then lifted off from a piece of clean aluminum foil and flown towards an uncovered hot-tub. After touching down on the surface of the hot tub water the membranes automatically deployed into the water. The drone was then allowed to sit for 10 minutes of sampling. Although no quantitation was performed, physiochemical conditions of the hot-tub were still rudimentarily measured using a thermometer and Aquacheck test strip giving a temperature of 38° C., pH of 7.2, free chlorine level of 5 ppm, total alkalinity of 180 (ppm equivalence of sodium Untargeted On-Site Determination of Water Contaminants Using the Floating Drone with the Sampling Apparatus Following the drone sampling of the hot-tub water, real on-site drone TF-SPME extractions were performed from a suspected landfill impacted stream south of London, Ontario at coordinates 42° 48' 36.48"N, 81° 19'07.56" W. The site consisted of a small stream that ran immediately beside a municipal landfill with several liquid settling pools, then under Ontario Highway 401, and then further to a small backroad where the sampling was conducted.

One 4 cm and one 2 cm HLB/PDMS TF-SPME membrane were attached to the drone for sampling. This allowed for immediate on-site analysis using portable GC-MS instrumentation and the ability to perform a comparative analysis on benchtop instrumentation once returned to the lab.

To replicate the sampling of a hard to reach location, the drone was launched from the edge of the bridge to the contaminated stream below. Once on the surface of the stream, the drone performed the 2 extractions for 10 minutes prior to retrieval. Due to the low air temperature (−4° C.), only one flight was completed before the drone battery depleted. Moreover, the water temperature was measured to be 1° C. and there was a thin layer of surface ice near the edges of the stream. In addition to the actual drone sampling, 4 replicate mock extractions were also performed with 2 cm HLB/PDMS TF-SPME membranes for laboratory analysis. All membranes that were returned to the laboratory for analysis were sealed in TD tubes and transported in a Styrofoam container filled with dry ice for approximately 3 hours.

Surprisingly, despite expecting high levels of phthalates, PCBs, PAH's and other compounds indicative of landfill leaching, only a small amount, near limit of detection (LOD) levels of phthalates were observed. Instead various alkylbenzenes were identified (Table 2). Although BTEX can originate from several anthropogenic sources, the high levels of styrene, 1,3,5 trichlorobenzene, and propylbenzenes strongly suggest contamination originating from the internal combustion of hydrocarbons, such as gasoline and diesel.

The proximity of Highway 401 to the sampled stream gives a probable source for this contamination. The fact that all of these components could be immediately identified on-site using portable GC-MS instrumentation following drone TF-SPME sampling is a good indicator of the potential impact of this methodology. Moreover, it was encouraging to see that the membranes brought back to the laboratory for analysis generated comparable results, whether they were deployed by drone, conventionally, or by using an in-bottle TF-SPME method. Both in-lab and on-site tentative identification was achieved using NIST database matching followed by partial confirmation using linear retention index values. The presence of BTEX was further confirmed on-site using an on-hand BTEX standard gas generating vial.

TABLE 2

Tentative identification of potential pollutants found in suspected landfill impacted stream water.

| | Drone portable GC-MS | | | Benchtop GC-MS | | | Detected by method | | | |
|---|---|---|---|---|---|---|---|---|---|---|
| | | | | | | | Drone; | Drone; | On-site; | In-Bottle; |
| Compound | R.T. (s) | RTI (calc) | RTI (lit) | R.T. (min) | RTI (calc) | RTI (lit) | Port. GC-MS | Bench-top | Bench-top | Bench-top |
| 3 methylpentane | 19.73 | 596 | 589 | ND | 751 | 589 | Yes | No | No | Yes |
| benzene | 24.81 | 658 | 648 | 2.86 | 872 | 648 | Yes | Yes | Yes | Yes |
| toluene | 33.8 | 765 | 755 | 3.66 | 881 | 755 | Yes | Yes | Yes | Yes |
| ethylbenzene | 42.44 | 873 | 854 | 4.69 | 909 | 854 | Yes | Yes | Yes | Yes |
| meta and para xylene | 43.18 | 882 | 862 | 4.78 | 926 | 862 | Yes | Yes | Yes | Yes |
| styrene | 45.30 | 904 | 914 | 5.06 | 971 | 914 | Yes | Yes | Yes | Yes |
| isopropylbenzene | 48.22 | 941 | 927 | 5.25 | 982 | 927 | Yes | Yes | Yes | Yes |
| propylbenzene | 50.90 | 976 | 962 | 5.77 | 751 | 962 | Yes | Yes | Yes | Yes |
| 1,3,5 trimethylbenzene | 51.9 | 988 | 992 | 5.89 | 872 | 992 | Yes | Yes | Yes | Yes |
| isopropenyl benzene | ND | ND | ND | 6.26 | 1014 | 994 | No | Yes | Yes | Yes |
| diethyl phthalate | ND | ND | ND | 12.11 | 1599 | 1594 | No | Yes | No | Yes |
| dibutyl phthalate | 130.4 | 1944 | 1936 | 14.46 | 1923 | 1936 | Yes* | Yes | Yes | Yes |
| di-n-octyl phthalate | N/D | N/D | N/D | 18.78 | N/A | 2685 | No | Yes | Yes | Yes |

*Only detectable by searching selected ions or reconstructed ion chromatograms (RIC)

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. An apparatus for sampling at least one analyte from a sampling fluid, the apparatus comprising:
   a solid-phase microextraction (SPME) sampling instrument comprising a support and an SPME coating covering at least a portion of the support;
   a connector attached to the SPME sampling instrument and coupleable to an aerial drone; and
   a protective cover sized and shaped to at least partially surround the SPME sampling instrument;
   wherein the SPME sampling instrument and the protective cover are movable in relation to each other between a protecting configuration and a sampling configuration,
   wherein the SPME sampling instrument and the protective cover are biased in the protecting configuration when the density of the fluid surrounding the SPME sampling instrument is less the density of the sampling fluid, and are biased in the sampling configuration when the density of the fluid surrounding the SPME sampling instrument is equal to or greater than the density of the sampling fluid, and
   wherein the SPME sampling instrument and the protective cover are movable between the protecting and sampling configurations, without a further external application of force, when the density of the fluid surrounding the SPME sampling instrument is changed.

2. The apparatus according to claim 1,
   wherein the protective cover at least partially surrounds the SPME sampling instrument when the apparatus is in the protecting configuration; and/or
   wherein the protective cover substantially shields the SPME sampling instrument from the environment when the apparatus is in the protecting configuration.

3. The apparatus according to claim 1, wherein the protective cover is fixed in relation to the aerial drone.

4. The apparatus according to claim 1, wherein the SPME sampling instrument is fixed in relation to the aerial drone.

5. The apparatus according to claim 1, wherein the apparatus comprises at least one floatable component having a density less than the density of the sampling fluid.

6. The apparatus according to claim 5, wherein the protective cover is fixed in relation to the aerial drone, and the floatable component biases the SPME sampling instrument in the sampling configuration when the density of the fluid surrounding the SPME sampling instrument is equal to or greater than the density of the sampling fluid.

7. The apparatus according to claim 6, further comprising a counterweight to the SPME sampling instrument,
   wherein the connector is a flexible linker and the SPME sampling instrument and the counterweight are connected to different ends of the linker, and
   wherein the floatable component is on the same end as the counterweight.

8. The apparatus according to claim 7, wherein the floatable component has a buoyancy force in the sampling fluid that is sufficient to support the counterweight in the sampling fluid.

9. The apparatus according to claim 7, wherein the floatable component has a buoyancy force in the sampling fluid that is sufficient to bias the SPME sampling instrument to the sampling configuration when the density of the fluid surrounding the SPME sampling instrument is equal to or greater than the density of the sampling fluid.

10. The apparatus according to claim 7, wherein the floatable component is separate from the counterweight, or wherein the floatable component comprises the counterweight.

11. The apparatus according to claim 5, wherein the SPME sampling instrument is fixed in relation to the aerial drone, and the floatable component biases the protective cover in the sampling configuration when the density of the fluid surrounding the SPME sampling instrument is equal to or greater than the density of the sampling fluid.

12. The apparatus according to claim 11, wherein the floatable component has a buoyancy force in the sampling fluid that is sufficient to support the protective cover in the sampling fluid.

13. The apparatus according to claim 11, wherein the floatable component has a buoyancy force in the sampling fluid that is sufficient to bias the protective cover to the sampling configuration when the density of the fluid surrounding the SPME sampling instrument is equal to or greater than the density of the sampling fluid.

14. The apparatus according to claim 11, wherein the protective cover comprises the floatable component, or is attached to the floatable component.

15. The apparatus according to claim 1, further comprising a cap that at least partially obstructs an opening in the protective cover when the SPME sampling instrument and the protective cover are biased in the protecting configuration.

16. The apparatus according to claim 15, wherein the cap is attached to the connector or to the SPME sampling instrument at an end distal to the aerial drone.

17. The apparatus according to claim 1, wherein the protective cover is tubular.

18. The apparatus according to claim 1, wherein the protective cover comprises a gas-chromatography liner suitable for use in a thermal desorption system.

19. The apparatus according to claim 18, wherein the gas-chromatography liner and the SPME sampling instrument are removable in combination.

20. An aerial drone coupled to the apparatus according to claim 1, wherein the aerial drone is floatable on the sampling fluid, and when the drone is floating on the sampling fluid the SPME sampling instrument and the protective cover are biased in the sampling configuration.

* * * * *